July 7, 1953 J. C. HEWITT, JR 2,644,242
WELL SURVEYING INSTRUMENT
Filed Feb. 28, 1949
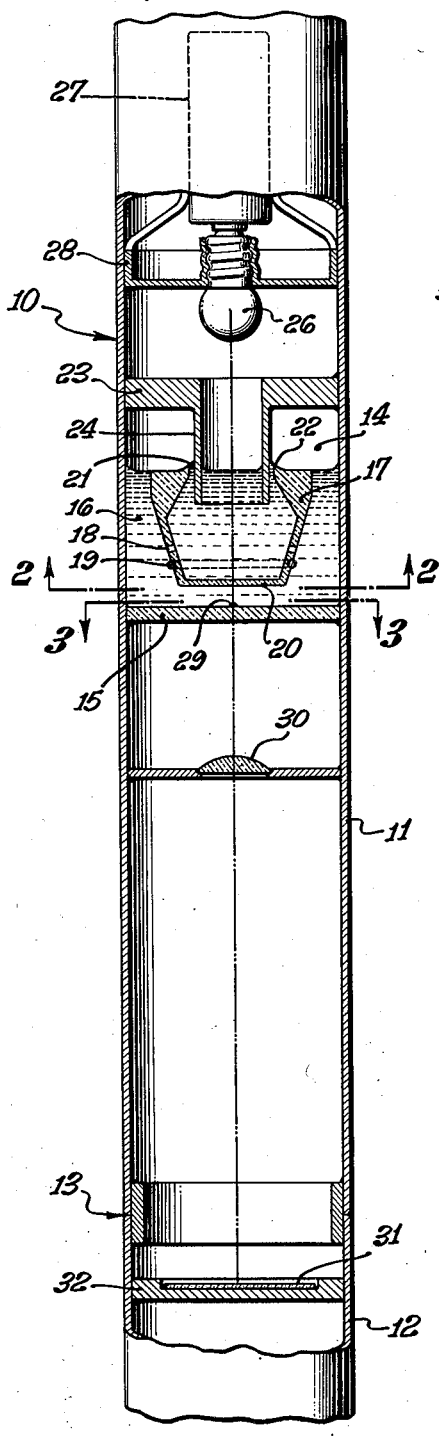
John C. Hewitt, Jr.
INVENTOR.
BY H. Calvin White
ATTORNEY.

UNITED STATES PATENT OFFICE 2,644,242

WELL SURVEYING INSTRUMENT

John C. Hewitt, Jr., Long Beach, Calif.

Application February 28, 1949, Serial No. 78,713

9 Claims. (Cl. 33—205.5)

This invention has to do generally with instruments for indicating or recording the position of a float-carried marking or index, and is directed particularly to improvements in orienting instruments employing a magnetically responsive (e. g. compass) float positioned between a vertically spaced light source and a light sensitive recording means, whereby the float position is recordable by transmission of light through the float.

One of my primary objects is to provide an instrument of the type employing a translucent float, whereby it is made possible to transmit the light beam free from interference through the vertical axial central portion of the float, and in so doing to effect recording illumination of the float with relation to a stationary marking located substantially in alinement with the normal vertical axis of the float.

Particularly contemplated in conjunction with light projection through the central portion of the float, is the use of float guide or centering means radially offset from the float axis so that its center remains unobstructed against light passage. It is found that centering of the float by maintaining about its axial light-passing portion a liquid meniscus barrier against radial displacement of the float, as in the manner more particularly dealt with in my copending application Serial Number 24,761, filed May 3, 1948, on "Instrument Float Control," now Patent No. 2,500,411, serves most effectively to accommodate the float to the requirements of a recording instrument.

In accordance with a preferred, though typical, construction, a translucent compass float carrying directional indicia is contained in a translucent chamber below a light source in axial alinement with the float, and from which light is projected downwardly through the float, liquid and chamber to a recording means, e. g. film, below. Interposition between the float and film of a reference marking stationary with reference to the chamber and alined with the normal vertical axis of the float, enables the record to show both the inclination of the instrument and the direction of the inclination. The float is centered in the chamber by a light passing guide depending from the top of the chamber below the liquid level therein so that the liquid forms an annular meniscus about and adjacent the surface of the guide. By shaping the float as hereinafter described and closely relating the specific gravity of the float to the liquid density, the float is caused to engage against the under side of the liquid meniscus which thus becomes a centering barrier for the float.

All the various features and objects of the invention, as well as the details of an illustrative embodiment will be fully understood from the following description of the accompanying drawing, in which:

Fig. 1 is a general view showing a typical form of the invention as embodied in a well surveying instrument;

Fig. 2 is a view taken from line 2—2 of Fig. 1 showing the float bottom markings;

Fig. 3 is a view taken from line 3—3 of Fig. 1 showing the stationary reference marking;

Fig. 4 is a fragmentary view illustrating the float and guide relation in an inclined position of the instrument; and Fig. 5 is a fragmentary sectional view illustrating a variational embodiment of the invention.

It will be understood that with respect to various features, the details of which are not essential to the present invention, the showing in Fig. 1 is a diagrammatical. As illustrative of the invention, the instrument is shown to comprise a tubular case 10 having upper and lower sections 11 and 12 interconnected at the joint 13.

Section 11 of the case contains a float chamber 14, the bottom of which is formed by transluscent or clear transparent wall 15. The float chamber contains a body of liquid 16 and a magnetically responsive float 17 which may be maintained in centered relation within the chamber, and at the true vertical position of the instrument, in axial alinement therewith. The centered and freely rotative condition of the float may be maintained by employing a liquid meniscus barrier against radial displacement of the float, in the manner disclosed in my copending application Ser. No. 24,761, referred to above.

The float is shown to have the form of a translucent or transparent hollow body 17, to the interior of which the liquid 16 is accessible through openings 18. The float may carry in any appropriate manner a magnetized element, as for example the ring 19, serving as a compass "needle" for maintaining the float oriented to the earth's magnetic poles or other external field. As illustrated in Fig. 2, the bottom surface 20 of the float may carry the illustrated directional indicia and the concentric circle angle-indicating markings. The top of the float contains a circular or cylindrical opening 21 immediately about which is a small dimension upstanding annular rim 22, the outer surface of which extends angularly and inwardly to intersect the wall of opening 21.

The float 17 may be made of any suitable material, such as a clear organic plastic, capable of transmitting light from the light source to the recording means. The float chamber 14 contains a body of liquid 16, such as perchlorethylene or any other suitable liquid, having proper specific gravity relation to the float. Generally speaking, the float material and liquid may be selected with relation to their specific gravities so that the float will remain immediately below or adjacent to the liquid surface. Assuming the liquid to be perchlorethylene having a specific gravity of about 1.6, the float material may be selected to have a specific gravity of about 1.2 to 1.5.

The top of the float chamber is formed by a transverse wall 23 carrying a cylindrical guide 24 depending below the surface of the liquid 16 in axial alinement with the float chamber. As illustrated, the liquid forms adjacent the wall of the guide 24 an annular meniscus 25, the under or convex side of which is engaged by the float rim 22. The relation between the meniscus, float rim and the size of opening 21 is such that the meniscus presents a barrier against lateral displacement of the float from accurately centered position in the chamber, and under normal conditions of use, against engagement of the float with the side of the guide. Preferably the guide is formed as a tube to contain the liquid 16 at its chamber level in all positions of the instrument.

A light source, such as lamp 26 and which may be supplied with current from any source, typically the battery 27, is carried by support 28 above the float chamber and in axial alinement with the guide tube 24. Light rays from the lamp pass downwardly through the tube, float and the translucent or transparent chamber bottom 15, the latter carrying a reference marking 29, see Fig. 3, having its center coincident with the chamber axis. Below the float chamber, a lens 30 directs the transmitted light rays to an appropriate light-sensitive recording means, such as the diagrammatically illustrated film disc 31 carried by support 32 within the lower section 12 of the case.

As will be understood, should a record be taken by brief illumination of the lamp 26 using any conventional type of energization control, not shown, with the instrument in true vertical position, the film 31 would record the indicia carried by the float surface 20 and the relatively stationary marking 29 in superimposed and axially centered alined relation. When a record is taken with the instrument in inclined position, as in Fig. 4, the centered position of the image of the marking 29 recorded on the film of course is unaffected by the inclination, but the superimposed image of the float-carried indicia is shifted relative to the image of the marking 29, to a degree and in a direction (both of which obviously are shown by the character of the markings on the float surface 20) in accordance with the degrees and direction of the inclination.

In Fig. 5 I have illustrated a variational embodiment of the invention differing from the previously described form with respect to the float, guide and float chamber assembly which has the same general relation to the light source 26, lens 30 and recording means 31 described with reference to Fig. 1. In the variational form, the float chamber body 35 contained within the instrument case 36 is shown to comprise a pair of sections 37 and 38 suitably held together in fluid tight engagement, as between rings 39, the chamber sections having latched hemispherical cavities 40 and 41 which together form the float chamber 42. Here the float guide 43 is shown to be of light-passing tubular form having a spherical bottom end 44, the lower portion of which depends below the level of the float chamber liquid 45.

The float in this instance consists generally of a hemispherical and transparent plastic body 46 having substantially hemispherical top cavity 47 receiving the bottom portion 44 of the guide tube. The float contains a suitable arrangement of passages 48 through which the liquid 45 is accessible to the cavity 47. The section of the top surface of the float with the wall of cavity 47 is defined by an upstanding annular rim 49 which engages against the underside of the liquid meniscus 50 to maintain the float in axially alined relation with the guide, as in the manner explained with reference to the centering of the float in Fig. 1. The float-carried polar magnetized compass element or needle is shown typically to be in ring form 51 placed concentrically in the top surface of the float.

As will be understood, the bottom surface of the float may carry indicia similar to those illustrated in Fig. 2. The relatively stationary reference marking 52, corresponding to 29 in Fig. 3, may be applied to a glass window 53 centrally positioned in the bottom of the float chamber and through which light passing from the lamp 26 through the guide tube 43, float 46 and the liquid 45, is transmitted to the lens and recording means below.

It will be understood that the drawing is to be regarded merely as illustrative of the invention in certain of its typical embodiments and that various changes and modifications may be made without departure from the invention in its intended spirit and scope.

I claim:

1. A direction indicating instrument comprising a chamber containing a body of liquid, a translucent magnetically responsive float carried by the liquid between vertically spaced locations and having a translucent central portion at substantially its central vertical axis through which light may pass, said liquid forming a meniscus extending annularly about and radially spaced from the vertical axis of the float and engaging the float to center it in the chamber, a light source mounted stationarily at one of said locations, means directing light from said source vertically through the center of said annular meniscus and through said translucent vertical axial central portion of the float, means stationary with relation to said chamber and providing a reference marking normally and substantially in alinement with the float axis, and light sensitive means at the other of said locations for recording the float position with relation to said marking.

2. A direction indicating instrument comprising a chamber containing a body of liquid, a translucent magnetically responsive float carried by the liquid and having a translucent central portion at substantially its central vertical axis through which light may pass, said liquid forming a meniscus extending annularly about and radially spaced from the vertical axis of the float and engaging the float to center it in the chamber, a light source mounted stationarily above and in substantial alinement with the vertical axis of the float, means directing light from said source downwardly through the center of said annular meniscus and through said translucent central portion of the float, means stationary with relation to said chamber and providing below the float in substantial alinement with its normal vertical axis a reference marking, and light sensitive means below said marking for recording the float position relative thereto.

3. A direction indicating instrument comprising a chamber containing a body of liquid, a translucent magnetically responsive float carried by said liquid and having a translucent central portion at substantially its central vertical axis through which light may pass, said liquid forming a meniscus extending annularly about and spaced from the float axis and engageable by the float to center the float in the chamber, a stationarily mounted light source, and means directing light from said source vertically through the center of said annular meniscus and through said translucent vertical axial central portion of the float.

4. A direction indicating instrument comprising a chamber containing a body of liquid, a translucent magnetically responsive float carried by said liquid, a guide depending from the top of the chamber, said liquid forming adjacent the surface of said guide an annular meniscus engageable by the float to center the float about the guide, and a light source above the chamber and from which light is projected through said guide and the float.

5. A direction indicating instrument comprising a chamber containing a body of liquid, a translucent magnetically responsive float carried by said liquid, a tubular guide depending from the top of the chamber below the liquid level therein, said liquid forming adjacent the surface of said guide an annular meniscus engageable by the float to center the float about the guide, and a light source above the chamber and from which light is projected through said guide and the float.

6. A direction indicating instrument comprising a chamber having a translucent bottom and containing a body of translucent liquid, a translucent magnetically responsive compass float carried by the liquid and having indicia to indicate the float polarity, a guide depending from the top of the chamber below the liquid level therein, said liquid forming adjacent the surface of said guide an annular meniscus engageable by the float to center the float about the guide, a light source above the guide and from which light is projected through the guide, float, liquid and chamber bottom, means below the float providing a reference marking normally and substantially in alinement with the vertical axis of the float, and light sensitive means below said marking for recording the relative positions of said float indicia and marking.

7. A direction indicating instrument comprising a chamber having a translucent bottom and containing a body of translucent liquid, a translucent magnetically responsive compass float carried by the liquid and having indicia to indicate the float polarity, a guide depending from the top of the chamber below the liquid level therein, said liquid forming adjacent the surface of said guide an annular meniscus and the float having an annular upstanding rim submerged in the liquid and engageable against the under side of said meniscus to center the float about the guide, a light source above the guide and from which light is projected through the guide, float, liquid and chamber bottom, means below the float providing a reference marking normally and substantially in alinement with the vertical axis of the float, and light sensitive means below said marking for recording the relative positions of said float indicia and marking.

8. A direction indicating instrument comprising a chamber having a translucent bottom and containing a body of translucent liquid, a translucent magnetically responsive compass float carried by the liquid and having indicia to indicate the float polarity, a tubular guide depending from the top of the chamber below the liquid level therein, said liquid forming adjacent the surface of said guide an annular meniscus and the float having a hollow interior containing the chamber liquid and having also an annular upstanding rim submerged in the liquid and engageable against the under side of said meniscus to center the float about the guide, a light source above the guide and from which light is projected through the guide, float, liquid and chamber bottom, means below the float providing a reference marking normally and substantially in alinement with the vertical axis of the float, and light sensitive means below said marking for recording the relative positions of said float indicia and marking.

9. A direction indicating instrument comprising a chamber containing a body of liquid, a translucent magnetically responsive float carried by said liquid and having a translucent central portion at substantially its normal central vertical axis, said liquid forming a meniscus extending annularly about and radially spaced from the normal vertical axis of the float and engaging the float to center it in the chamber, a light source mounted stationarily at a location to pass light vertically through the center of said annular meniscus and through said translucent vertical axial central portion of the float, means forming a reference marking positioned stationarily along the path of light through said float, a marking on the float, and light sensitive means in the path of light directed through the float and acting to record the relative positions of said float and stationary markings.

JOHN C. HEWITT, Jr.

References Cited in the file of this patent

UNITED STATES PATENTS

| Number | Name | Date |
| --- | --- | --- |
| 856,990 | Schweder | June 11, 1907 |
| 1,754,055 | Senter | Apr. 8, 1930 |
| 1,912,358 | Bush | June 6, 1933 |
| 1,987,696 | McLaughlin | Jan. 15, 1935 |
| 2,124,892 | Nichols | July 26, 1938 |
| 2,169,342 | Hewitt | Aug. 15, 1939 |
| 2,378,526 | Agnew | June 19, 1945 |
| 2,414,702 | Smith | Jan. 21, 1947 |
| 2,432,875 | Flint | Dec. 16, 1947 |

FOREIGN PATENTS

| Number | Country | Date |
| --- | --- | --- |
| 117,161 | Great Britain | 1918 |
| 128,959 | Germany | 1900 |